UNITED STATES PATENT OFFICE.

ROBERT HUTCHISON, OF COWLAIRS, SCOTLAND.

GUTTA-PERCHA OR RUBBER COMPOUND.

SPECIFICATION forming part of Letters Patent No. 518,817, dated April 24, 1894.

Application filed August 1, 1893. Serial No. 482,085. (No specimens.)

*To all whom it may concern:*

Be it known that I, ROBERT HUTCHISON, a subject of the Queen of Great Britain and Ireland, and a resident of Cowlairs, county of Lanark, Scotland, have invented certain Improvements in Gutta-Percha or Rubber Compounds, of which the following is a specification.

My said invention has for its objects, to render gutta-percha or rubber or a mixture thereof less liable to oxidation and consequent disintegration, to improve its elasticity, to diminish its liability to become sticky or tacky, and to increase its tenacity.

My improved treatment, facilitates the combining of gutta-percha with rubber, and the forming therewith of improved compounds having valuable properties for practical applications; and while not diminishing the insulating property of gutta-percha or rubber increases its durability when applied for electrical purposes.

My invention consists in combining with gutta-percha or rubber or a mixture thereof, a substance which I term "lanichol." I find that the term "lanolin" (or lanoline) has, heretofore been given to a variety of products containing wool cholesterine combined with more or less fatty acid, water, and impurities; and to distinguish from such products, the substance used in carrying out my present invention the name lanichol is given to it, this term consisting of an abbreviation of the well known chemical term cholesterine together with a prefix indicative of the source of the cholesterine. The lanichol, which is a substance separated from the greases recovered as a by product in the manufacture of wools, may be combined with gutta-percha or rubber or a mixture thereof in various proportions according to the conditions as regards softness or otherwise desiderated in the compound. The combination is effected by thoroughly incorporating the ingredients with the aid of moderate heat, say a temperature of about 212° Fahrenheit in apparatus of the kind used for malaxating or kneading rubber or rubber compounds. As an example, it may be stated that a very excellent electrical insulating compound is formed by combining fifty parts, by weight, of gutta-percha, thirty parts rubber, and twenty parts lanichol. I do not however restrict myself to any particular proportions of the ingredients.

For some purposes compounds formed with lanichol (from which fatty acids or glycerides of the wool greases have been separated) may be vulcanized like ordinary rubber, and may also have combined therewith any suitable one or more of such ingredients, preferably of an inert nature, as are usually combined with ordinary rubber.

Instead of first separating the lanichol from the wool greases, and subsequently combining the lanichol with the gutta-percha, or rubber or mixture thereof, I may save the trouble, time, and expense of the separating process, and avail of the property which I have discovered gutta-percha and rubber to possess of absorbing lanichol from mixtures containing it. I place the gutta-percha or rubber or a mixture thereof, preferably in a comminuted state, in a boiler or suitable vessel along with the wool grease and water. On boiling, the grease and gutta-percha or rubber or mixture thereof become combined. This mixture is next boiled in a solution of carbonate or preferably caustic alkali, the operation removing saponifiable matters and leaving the lanichol of the grease combined with the gutta-percha or rubber or mixture thereof. According to another modification I first boil the wool grease in a solution containing slightly more carbonate or preferably caustic alkali than suffices to saponify any free fatty acids present in the grease. I then dilute the soapy solution or emulsion thus obtained, and immerse in it the gutta-percha or rubber or mixture thereof preferably in a comminuted state. On boiling, the gutta-percha or rubber or mixture thereof takes up the lanichol and leaves the other matters in the liquid. The gutta-percha or rubber or mixture thereof will take up various proportions of lanichol, to the extent even of thirty per cent. or more of lanichol in the resulting compound. Thus, for example forty pounds of rubber may have combined with it the lanichol of thirty pounds of wool grease; and in making such a compound after saponifying as required the liquid may be diluted with one hundred to one hundred and sixty pounds water or whatever quantity is found necessary to allow of the easy separation of the lanichol. Not only is there in these modified processes a very complete separation of the lanichol from the wool grease, but there is also the advantage of the gutta-percha and rubber being thoroughly cleansed and freed from impurities.

What I claim is—

The herein described composition, consisting of gutta percha or rubber or mixtures thereof and wool cholesterine.

In testimony whereof I have signed my name to this specification in the presence of two subscribing witnesses.

ROBERT HUTCHISON.

Witnesses:
EDMUND HUNT,
DAVID FERGUSON.